United States Patent
Lee et al.

(10) Patent No.: US 11,938,713 B2
(45) Date of Patent: Mar. 26, 2024

(54) PROTECTIVE FILM

(71) Applicant: Samsung Display Co., LTD., Yongin-si (KR)

(72) Inventors: Jae Bok Lee, Yesan-gun (KR); Hang Gyun Park, Suwon-si (KR); Jin Woo Park, Anyang-si (KR); Sung Hoon Lee, Cheonan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 486 days.

(21) Appl. No.: 17/012,103

(22) Filed: Sep. 4, 2020

(65) Prior Publication Data

US 2021/0237399 A1  Aug. 5, 2021

(30) Foreign Application Priority Data

Feb. 3, 2020 (KR) ........................ 10-2020-0012564

(51) Int. Cl.
*B32B 7/12* (2006.01)
*B32B 3/08* (2006.01)
(Continued)

(52) U.S. Cl.
CPC ................ *B32B 7/12* (2013.01); *B32B 3/08* (2013.01); *B32B 3/266* (2013.01); *B32B 7/06* (2013.01);
(Continued)

(58) Field of Classification Search
CPC ............. Y10T 428/14; Y10T 428/1424; Y10T 428/1429; Y10T 428/1452; Y10T 428/1471; Y10T 428/1476; Y10T 428/24273; Y10T 428/24298; Y10T 428/24314; Y10T 428/24322; Y10T 428/24331; Y10T 428/24752; Y10T 428/24777; B32B 3/00; B32B 3/02; B32B 3/08; B32B 3/085; B32B 3/10;
(Continued)

(56) References Cited

U.S. PATENT DOCUMENTS 10,843,400 B2  11/2020  Han et al.
11,235,510 B2  2/2022  Han et al.

FOREIGN PATENT DOCUMENTS

CN  203344387 U  12/2013
CN  205553452 U  9/2016
(Continued)

OTHER PUBLICATIONS

Machine translation (Espacenet) of DE 10 2006 010 745 B3. Translated Nov. 5, 2022. (Year: 2022).*

*Primary Examiner* — Maria V Ewald
*Assistant Examiner* — Ethan A. Utt
(74) *Attorney, Agent, or Firm* — CANTOR COLBURN LLP

(57) ABSTRACT

A protective film is provided. The protective film includes a release film, a base film which is disposed on the release film and comprises a protective part and a first pull tab part protruding from a first side surface of the protective part, and a first dummy film which is disposed on the release film, does not overlap the base film in a plan view, and comprises a part partially surrounding the first pull tab part, where edges of the base film and edges of the first dummy film are disposed inside edges of the release film in the plan view.

16 Claims, 25 Drawing Sheets

(51) Int. Cl.
*B32B 3/26* (2006.01)
*B32B 7/06* (2019.01)
*C09J 7/29* (2018.01)
*C09J 7/38* (2018.01)
*C09J 7/40* (2018.01)

(52) U.S. Cl.
CPC . *C09J 7/29* (2018.01); *C09J 7/38* (2018.01); *C09J 7/403* (2018.01); *B32B 2307/748* (2013.01); *B32B 2457/20* (2013.01); *B32B 2571/00* (2013.01); *C09J 2203/326* (2013.01); *C09J 2301/122* (2020.08)

(58) Field of Classification Search
CPC .. B32B 3/14; B32B 3/26; B32B 3/266; B32B 7/00; B32B 7/04; B32B 7/06; B32B 7/12; B32B 2405/00; C09J 7/00; C09J 7/20; C09J 7/201; C09J 7/203; C09J 7/22; C09J 7/24; C09J 7/241; C09J 7/243; C09J 7/25; C09J 7/255; C09J 7/29; C09J 7/30; C09J 7/38; C09J 7/381; C09J 7/383; C09J 7/385; C09J 7/387; C09J 7/40; C09J 7/401; C09J 7/403; C09J 7/405
USPC ......... 428/40.1, 40.6, 40.7, 41.3, 41.7, 41.8, 428/77–79, 131, 134, 136–138, 189, 192
See application file for complete search history.

(56) References Cited

FOREIGN PATENT DOCUMENTS

| | | | | |
|---|---|---|---|---|
| CN | 108657628 A | 10/2018 | | |
| CN | 109664595 A | 4/2019 | | |
| DE | 102006010745 B3 | * 9/2007 | ................ | C09J 7/02 |
| JP | 6335604 B2 | 5/2018 | | |
| KR | 1020190028617 A | 3/2019 | | |
| KR | 1020190042131 A | 4/2019 | | |
| KR | 1020190063504 A | 6/2019 | | |

* cited by examiner

PROTECTIVE FILM

This application claims priority to Korean Patent Application No. 10-2020-0012564, filed on Feb. 3, 2020, and all the benefits accruing therefrom under 35 U.S.C. § 119, the content of which in its entirety is herein incorporated by reference.

BACKGROUND

1. Field

The present disclosure relates to a protective film.

2. Description of the Related Art

A glass article is widely used in an electronic device including a display device, a building material, and the like. For example, the glass article is applied to a substrate of a flat panel display device such as a liquid crystal display ("LCD"), an organic light emitting diode ("OLED") display or an electrophoretic display ("EPD"), or to a cover window for protecting the flat panel display device.

A colorless polyimide ("CPI") film is used for a cover window of a conventional foldable display device. However, ultra-thin glass is recently drawing attention due to its low vulnerability to scratches and its possibility of bidirectional folding.

SUMMARY

To protect a cover window from an external environment during a process of manufacturing a display device, the cover window may be covered with a protective film. The cover window may be protected by the protective film during a certain process.

Aspects of the present disclosure provide a protective film which can save the cost and time required for jig replacement when a release film is peeled off and can improve a peeling success rate.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a protective film including a release film, a base film which is disposed on the release film and comprises a protective part and a first pull tab part protruding from a first side surface of the protective part, and a first dummy film which is disposed on the release film, does not overlap the base film in a plan view, and comprises a part partially surrounding the first pull tab part, where edges of the base film and edges of the first dummy film are disposed inside edges of the release film in the plan view.

According to another aspect of the present disclosure, there is provided a protective film including a release film, an adhesive layer which is disposed on the release film, a first film which is disposed on the adhesive layer and comprises a protective part and a protruding part protruding from a side of the protective part, and a second film which is disposed on the adhesive layer and comprises a part disposed adjacent to the protruding part, where edges of the first film and edges of the second film are disposed inside edges of the release film in a plan view, and the adhesive layer is disposed only in an area where the release film overlaps the first film and the second film in the plan view.

A protective film according to an embodiment can save the cost and time required for jig replacement when a release film is peeled off and can improve a peeling success rate.

However, the effects of the embodiments are not restricted to the one set forth herein. The above and other effects of the embodiments will become more apparent to one of daily skill in the art to which the embodiments pertain by referencing the claims.

The effects of the present disclosure are not limited to the aforementioned effects, and various other effects are included in the present specification.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
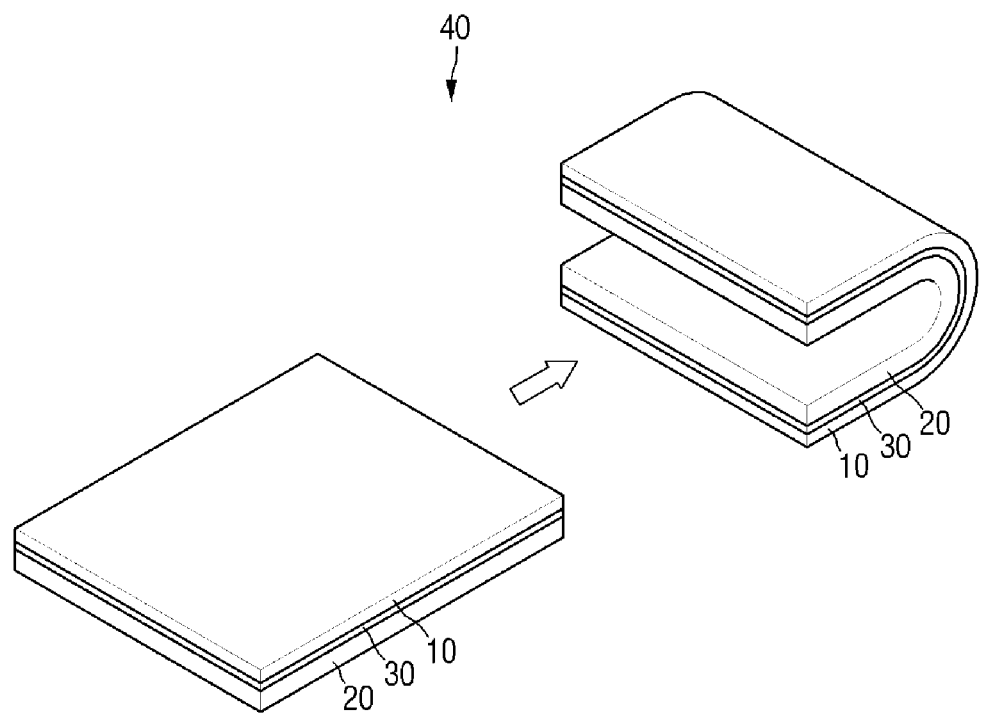
FIG. 1 is a perspective view illustrating an example in which a glass article according to an embodiment is applied as a cover window of a display device.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, the term "glass article" refers to an article entirely or partially made of glass.

Hereinafter, embodiments will be described with reference to the attached drawings.

Figure 2:
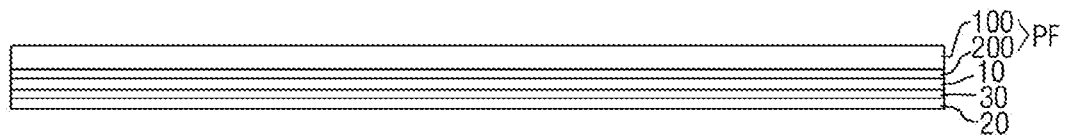
FIG. 2 is a cross-sectional view of the display device to which a protective film according to an embodiment has been attached.

FIG. 1 is a perspective view illustrating an example in which a glass article according to an embodiment is applied as a cover window of a display device 40. FIG. 2 is a cross-sectional view of the display device to which a protective film according to an embodiment has been attached.

Referring to FIGS. 1 and 2, glass is used as a cover window for protecting a display device, as a substrate for a display panel, as a substrate for a touch panel, as an optical member such as a light guide plate, etc. in electronic devices including display devices such as tablet personal computers ("PCs"), notebook PCs, smartphones, electronic books, televisions and PC monitors as well as refrigerators and washing machines including display screens. The glass may also be used for cover glass of vehicle dashboards, cover glass of solar cells, building interior materials, and windows of buildings or houses.

In FIG. 1, an example in which the glass article 10 is applied as the cover window of the display device 40 is illustrated. Referring to FIG. 1, the display device 40 may include a display panel 20, the glass article 10 disposed on the display panel 20, and an optically-clear bonding layer 30 disposed between the display panel 20 and the glass article 10 to bond the display panel 20 and the glass article 10 together.

The display device 40 according to an embodiment may be a foldable display device 40. The display panel 20 used in the foldable display device 40 may be a flexible panel that can be at least partially folded.

The display panel 20 may be, for example, a self-luminous display panel such as an organic light emitting diode ("OLED") display panel, an inorganic electroluminescent ("EL") display panel, a quantum dot light emitting display panel ("QED"), a micro-light emitting diode ("LED") display panel, a nano-LED display panel, a plasma display panel (PDP), a field emission display panel ("FED") or a cathode ray tube ("CRT") display panel or may be a light receiving display panel such as a liquid crystal display ("LCD") panel or an electrophoretic display ("EPD") panel.

The display panel 20 may include a plurality of pixels and may display an image using light emitted from each pixel. The display device 40 may further include a touch sensing member (not illustrated). In an embodiment, the touch sensing member may be internalized in the display panel 20. For example, the touch sensing member may be directly disposed on a display member of the display panel 20 so that the display panel 20 itself can perform a touch function. In another embodiment, the touch sensing member may be manufactured separately from the display panel 20 and then attached to an upper surface of the display panel 20 by the optically-clear bonding layer 30.

The glass article 10 is disposed on the display panel 20. The glass article 10 disposed on the display panel 20 protects the display panel 20. The glass article 10 used as the cover window of the foldable display device 40 may be ultra-thin glass. The ultra-thin glass may have a thickness of about 300 micrometers (μm) or less or about 100 μm or less.

The optically-clear bonding layer 30 is disposed between the display panel 20 and the glass article 10. The optically-clear bonding layer 30 fixes the glass article 10 on the display panel 20. The optically-clear bonding layer 30 may include an optical clear adhesive ("OCA") or an optical clear resin ("OCR"). When the display device 40 is folded, the glass article 10 and the optically-clear bonding layer 30 may be folded into a shape corresponding to a folded shape of the display panel 20.

A protective film body PF may include a base film 100 and an adhesive layer 200 disposed on the base film 100. The protective film body PF is attached onto a surface of the display device 40. Although not illustrated in the drawings, the protective film body PF may also be attached to cover a part of the display device 40 including not only a major surface of the display device 40 but also side edges of the surface.

Figure 3:
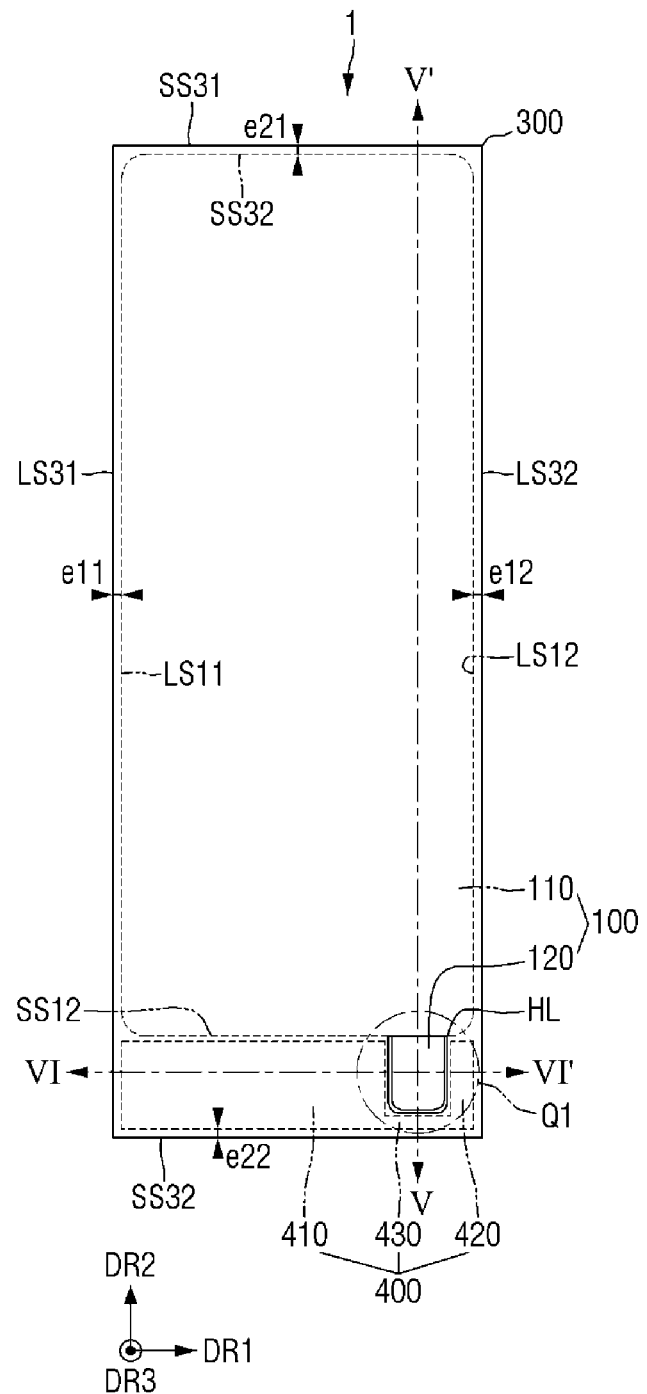
FIG. 3 is a plan view of a protective film according to an embodiment.
Figure 4:
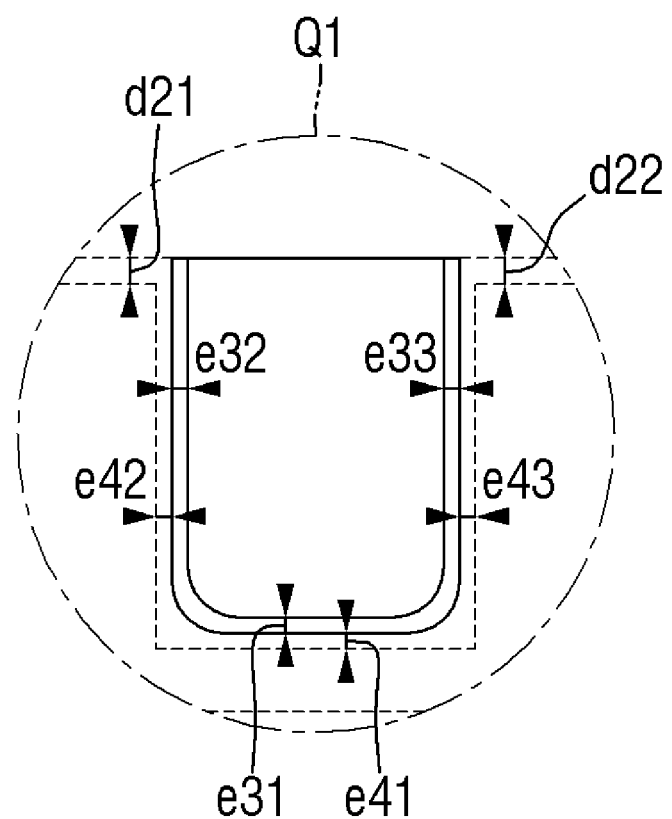
FIG. 4 is an enlarged view of area Q1 of FIG. 3.
Figure 5:
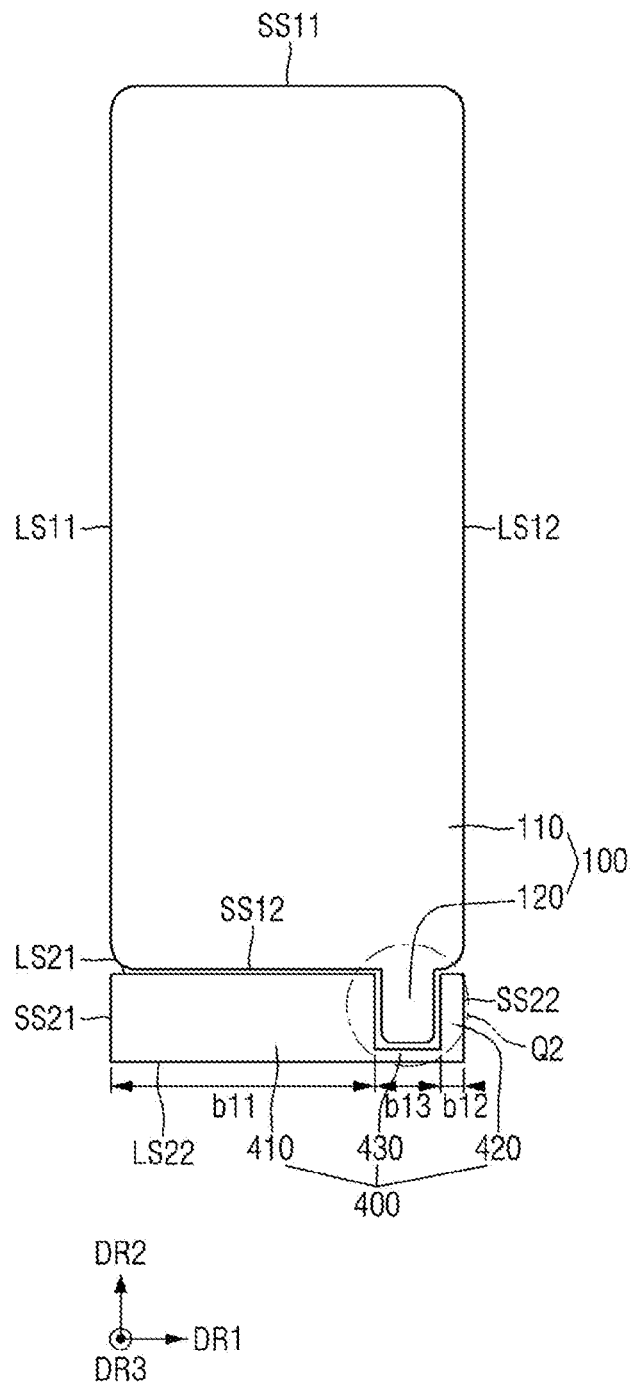
FIG. 5 is a plan view of a base film and a dummy film according to an embodiment.
Figure 6:
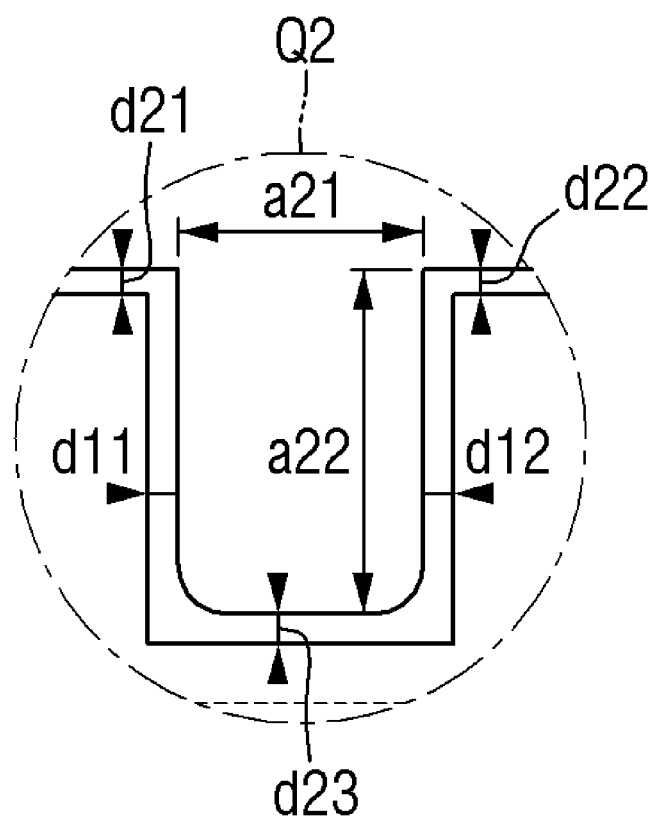
FIG. 6 is an enlarged view of area Q2 of FIG. 5.
Figure 7:
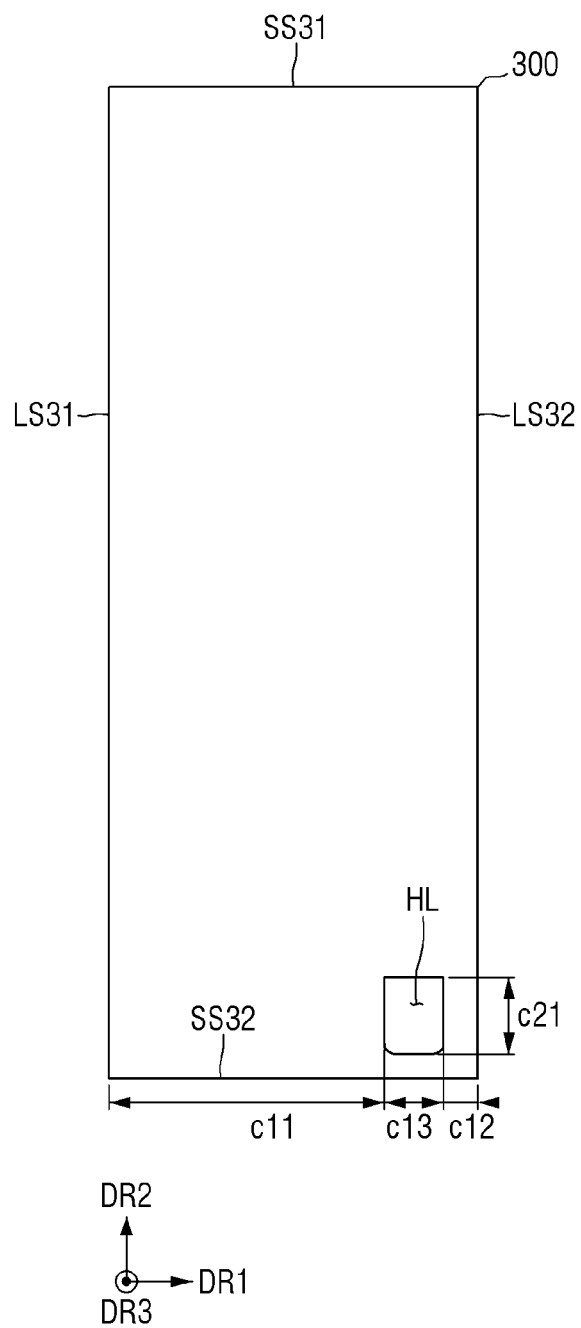
FIG. 7 is a plan view of a release film according to an embodiment.
Figure 8:
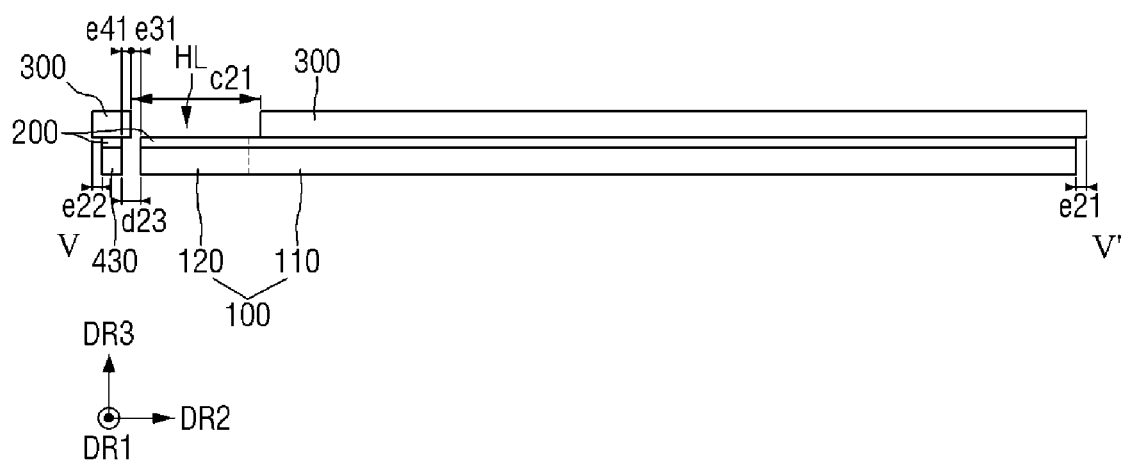
FIG. 8 is a cross-sectional view taken along line V-V' of FIG. 3.
Figure 9:
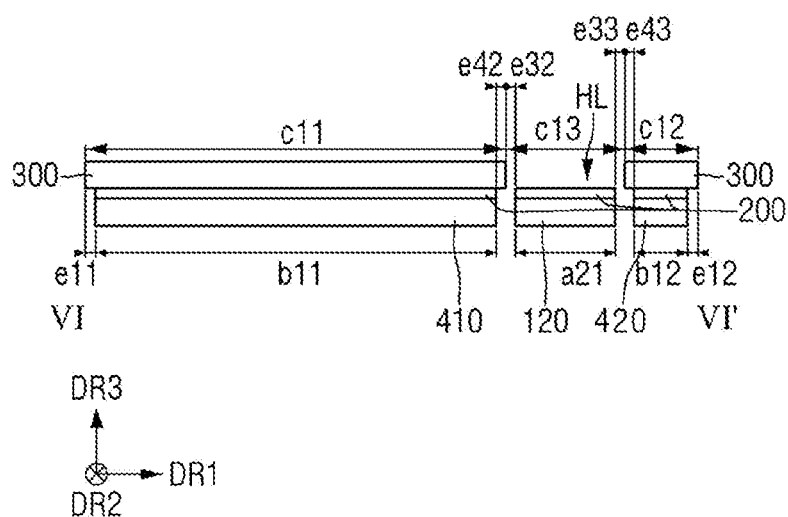
FIG. 9 is a cross-sectional view taken along line VI-VI' of FIG. 3.

FIG. 3 is a plan view of a protective film according to an embodiment. FIG. 4 is an enlarged view of area Q1 of FIG. 3. FIG. 5 is a plan view of a base film and a dummy film according to an embodiment. FIG. 6 is an enlarged view of area Q2 of FIG. 5. FIG. 7 is a plan view of a release film according to an embodiment. FIG. 8 is a cross-sectional view taken along line V-V' of FIG. 3. FIG. 9 is a cross-sectional view taken along line VI-VI' of FIG. 3.

Referring to FIGS. 3 through 9, the protective film 1 according to the embodiment may include the release film 300 and the base film 100 and the dummy film 400 which are disposed on the release film 300. Each of the release film 300, the base film 100, and the dummy film 400 may be a film having a predetermined thickness. For ease of description, a short side, a long side, a first side, or a second side will be mentioned below based on a plan view, but it may also denote an edge of a side surface of each element.

The base film 100 may include a protective part 110 and a pull tab part 120 protruding outward from a side surface of the protective part 110, as shown in FIG. 3. Although the pull tab part 120 protrudes toward a second side in a second direction DR2 from a second side surface of the protective part 110 in FIG. 3, the present disclosure is not limited thereto.

The protective part 110 included in the base film 100 according to the embodiment may be an element for substantially protecting the display device 40 when the protective film body PF is attached to the display device 40. The protective part 110 may be rectangular in a plan view. The protective part 110 may include first and second long sides LS11 and LS12 extending in the second direction DR2 in the plan view and first and second short sides SS11 and SS12 extending in a first direction DR1 in the plan view. The first and second long sides LS11 and LS12 of the protective part 110 may be parallel to each other, and the first and second short sides SS11 and SS12 of the protective part 110 may be parallel to each other, but the present disclosure is not limited thereto. Portions of the protective part 110 where the first and second long sides LS11 and LS12 and the first and second short sides SS11 and S12 are connected may be in a rounded shape. However, the present disclosure is not limited thereto, and those portions may also be angled in another embodiment. The planar shape of the protective part 110 may not be limited to the above example, and may also be a circular or other shape in another embodiment.

A width of the protective part 110 in the first direction DR1 may be defined as a distance between the first long side LS11 and the second long side LS12. A width of the protective part 110 in the second direction DR2 may be defined as a distance between the first short side SS11 and the second short side SS12. The width of the protective part 110 in the first direction DR1 and the width of the protective part 110 in the second direction DR2 may be constant across all areas, but the present disclosure is not limited thereto. The width of the protective part 110 in the first direction DR1 may be about 65 to 70 millimeters (mm), and the width of the protective part 110 in the second direction DR2 may be about 160 to 165 mm, but the present disclosure is not limited thereto. The width of the protective part 110 in the second direction DR2 may be about 2.28 to 2.54 times the width of the protective part 110 in the first direction DR1, but the present disclosure is not limited thereto.

The base film 100 may be provided with the pull tab part 120. The pull tab part 120 may make it easy to operate the base film 100. For example, the pull tab part 120 may be pulled to peel the base film 100 off from a surface to which the base film 100 is attached. The pull tab part 120 may be connected to the protective part 110. For example, the pull tab part 120 may protrude from a side surface of the protective part 110. In an embodiment, the pull tab part 120 may protrude toward the second side in the second direction DR2 from a side surface including the second short side SS12 of the protective part 110. However, the present disclosure is not limited thereto. In another embodiment, the pull tab part 120 may also protrude outward from any one of a side surface including the first short side SS11, a side surface including the first long side LS11, and a side surface including the second long side LS12. Alternatively, the pull tab part 120 may be disposed in plural numbers on one side surface, but the present disclosure is not limited thereto.

A protruding end of the pull tab part 120 according to an embodiment may be in a rounded shape in the plan view. However, the present disclosure is not limited thereto, and the protruding end of the pull tab part 120 may also be angled in another embodiment. A thickness of the pull tab part 120 may be equal to a thickness of the protective part 110 in a third direction DR3. Therefore, the pull tab part 120 and the protective part 110 may be connected without a step.

A protruding length a22 of the pull tab part 120 in the second direction DR2 may be greater than a width a21 of the pull tab part 120 in the first direction DR1 perpendicular to a protruding direction of the pull tab part 120. However, the present disclosure is not limited thereto. In another embodiment, the protruding length a22 of the pull tab part 120 in the second direction DR2 may also be equal to or smaller than the width a21 of the pull tab part 120 in the first direction DR1 perpendicular to the protruding direction of the pull tab part 120. The protruding length a22 of the pull tab part 120 in the second direction DR2 may be about 15 to 20 mm, and the width a21 of the pull tab part 120 in the first direction DR1 may be about 8 to 12 mm, but the present disclosure is not limited thereto. The protruding length a22 of the pull tab part 120 in the second direction DR2 may be about 1.25 to 2.5 times the width a21 of the pull tab part 120 in the first direction DR1, but the present disclosure is not limited thereto.

The base film 100 may include at least one of polyethylene terephthalate ("PET"), polyethylene naphthalate ("PEN"), polycarbonate ("PC"), polymethyl metacrylate ("PMMA"), polystyrene ("PS"), polyvinyl chloride ("PVC"), polyethersulfone ("PES"), polyethylene ("PE"), polypropylene ("PP"), a TRF film, and combinations of the same, for example.

A thickness of the base film 100 may be about 10 μm or more, about 20 μm or more, about 50 μm or more, or about 100 μm or more. In an embodiment, the thickness of the base film 100 may be about 25 μm to about 75 μm. The base film 100 whose thickness is within the above range can sufficiently protect the surface of the display device 40 without excessively increasing a total thickness of the protective film body PF.

In an embodiment, the dummy film 400 may be disposed on the second side of the base film 100 in the second direction DR2 to surround the pull tab part 120. The dummy film 400 may be provided to reduce a step in the protruding direction of the base film 100 which has a shape protruding toward the second side in the second direction DR2 due to the pull tab part 120. The dummy film 400 may be provided in a shape complementary to the shape of the pull tab part 120. For example, a first side, in the second direction DR2, of the dummy film 400 facing the pull tab part 120 may be recessed in the protruding direction of the pull tab part 120.

The dummy film 400 may include a first part 410 disposed on a second side of the pull tab part 120 in the first direction DR1, a second part 420 disposed on a first side of the pull tab part 120 in the first direction DR1, and a third part 430 connecting the first part 410 and the second part 420 and disposed on a third side of the pull tab part 120 in the second direction DR2. Each of the first part 410, the second part 420 and the third part 430 of the dummy film 400 may be rectangular. However, the present disclosure is not limited thereto, and an edge of the dummy film 400 which is adjacent to the pull tab part 120 may also be in a rounded shape in another embodiment. The first part 410, the second part 420 and the third part 430 of the dummy film 400 may be integrally formed.

The dummy film 400 may include first and second long sides LS21 and LS22 extending in the first direction DR1 and first and second short sides SS21 and SS22 extending in the second direction DR2. The first long side LS21 of the dummy film 400 may be the first side of the dummy film 400 in the second direction DR2, and the second long side LS22 of the dummy film 400 may be a second side of the dummy film 400 in the second direction DR2. The first short side SS21 of the dummy film 400 may be a second side of the dummy film 400 in the first direction DR1, and the second short side SS22 of the dummy film 400 may be a first side of the dummy film 400 in the first direction DR1. Each of the second long side LS22 and the first and second short sides SS21 and SS22 of the dummy film 400 may be shaped like a straight line, but the first long side LS21 may be recessed in the second direction DR2 to correspond to the protruding shape of the pull tab part 120. Corners of a recessed area of the first long side LS21 of the dummy film 400 may be right-angled. However, the present disclosure is not limited thereto, and the corners may also be in a rounded shape in another embodiment.

A width b11 of the first part 410 of the dummy film 400 in the first direction DR1 may be greater than a width b12 of the second part 420 in the first direction DR1 and greater than a width b13 of the third part 430 in the first direction DR1. In addition, the width b13 of the third part 430 in the first direction DR1 may be greater than the width b12 of the second part 420 in the first direction DR1. For example, the width b11 of the first part 410 of the dummy film 400 in the first direction DR1 may be about 46 to 51 mm, the width b12 of the second part 420 in the first direction DR1 may be about 4 to 7 mm, and the width b13 of the third part 430 in the first direction DR1 may be about 12 to 16 mm, but the present disclosure is not limited thereto.

A width of the first part 410 of the dummy film 400 in the second direction DR2 may be equal to a width of the second part 420 in the second direction DR2. For example, the widths of the first and second parts 410 and 420 of the dummy film 400 in the second direction DR2 may be, but are not limited to, about 18 to 23 mm. A width of the third part 430 of the dummy film 400 in the second direction DR2 may be, but is not limited to, about 0.5 to 2 mm.

The dummy film 400 may be spaced apart from the base film 100 by a predetermined distance. The distance (d11, d12, d21, d22, d23) between the dummy film 400 and the base film 100 may be different depending on a location. However, the present disclosure is not limited thereto, and the distance (d11, d12, d21, d22, d23) may also be uniform in another embodiment.

A distance d21 between the protective part 110 of the base film 100 and the first part 410 of the dummy film 400 disposed adjacent to the protective part 110 in the second direction DR2 may be uniform across all areas. A distance d22 between the protective part 110 of the base film 100 and the second part 420 of the dummy film 400 disposed adjacent to the protective part 110 in the second direction DR2 may be uniform across all areas.

Distances d11, d12 and d23 between the pull tab part 120 of the base film 100 and the dummy film 400 adjacent to and facing the pull tab part 120 may be uniform across all areas. In the plan view, the distances d11, d12 and d23 between sides constituting the protruding shape of the pull tab part 120 and sides constituting the recessed shape of the dummy film 400 disposed adjacent to the pull tab part 120 may be, but are not limited to, equal to each other. Specifically, the distance d11 between the pull tab part 120 and the first part 410 of the dummy film 400 in the first direction DR1, the distance d12 between the pull tab part 120 and the second part 420 of the dummy film 400 in the first direction DR1, and the distance d23 between the pull tab part 120 and the third part 430 of the dummy film 400 in the second direction DR2 may be equal.

Each of the distances d21 and d22 between the protective part 110 of the base film 100 and the dummy film 400 disposed adjacent to the protective part 110 may be smaller than each of the distances d11, d12 and d23 between the pull tab part 120 of the base film 100 and the dummy film 400 disposed adjacent to the pull tab part 120. For example, each of the distances d21 and d22 between the protective part 110 of the base film 100 and the dummy film 400 facing the protective part 110 may be about 0.5 to 2 mm, and each of the distances d11, d12 and d23 between the pull tab part 120 of the base film 100 and the dummy film 400 facing the pull tab part 120 may be about 1 to 3 mm, but the present disclosure is not limited thereto. In an embodiment, each of the distances d11, d12 and d23 between the pull tab part 120 of the base film 100 and the dummy film 400 adjacent to and facing the pull tab part 120 may be about 1.5 to 2.5 times each of the distances d21 and d22 between the protective part 110 of the base film 100 and the dummy film 400 adjacent to and facing the protective part 110, but the present disclosure is not limited thereto.

The dummy film 400 may overlap the protective part 110 of the base film 100 in the second direction DR2. The dummy film 400 may overlap the pull tab part 120 of the base film 100 in the first direction DR1 and the second direction DR2.

The dummy film 400 may have the same thickness in the third direction DR 3 as the base film 100. A first major surface of the dummy film 400 in a third direction DR3 may be aligned with a first major surface of the base film 100 in the third direction DR3. A second major surface of the dummy film 400 in the third direction DR3 may be aligned with a second major surface of the base film 100 in the third direction DR3. Specifically, referring to FIGS. 8 and 9, the third part 430 of the dummy film 400 may overlap the protective part 110 and the pull tab part 120 of the base film 100 in the second direction DR2. In addition, the pull tab part 120 may overlap the first part 410 and the second part 420 of the dummy film 400 in the first direction DR1. However, the present disclosure is not limited thereto.

A width of the dummy film 400 in the first direction DR1 may be equal to a width of the base film 100 in the first direction DR1. In a plan view, the first side SS22 of the dummy film 400 in the first direction DR1 may be aligned in the second direction DR2 with a first side LS12 of the base film 100 in the first direction DR1. In addition, in the plan view, the second side SS21 of the dummy film 400 in the first direction DR1 may be aligned in the second direction DR2 with a second side LS11 of the base film 100 in the second direction DR2.

The base film 100 and the dummy film 400 described above may be disposed on the release film 300. The release film 300 may temporarily protect an adhesive surface of the base film 100 from contamination by dust, debris, moisture, and other contaminants.

The release film 300 may define a hole HL therein. In the protective film 1 according to the embodiment, the hole HL defined in the release film 300 may expose a surface of the pull tab part 120. In order to increase the visibility of the pull tab part 120 in a subsequent process, a color tape may be attached to a surface of the pull tab part 120. To this end, the pull tab part 120 of the base film 100 needs to be exposed. The shape of the hole HL may correspond to the shape of the pull tab part 120. That is, edges of the hole HL may be disposed along edges of the pull tab part 120 at a predetermined distance from the edges of the pull tab part 120. In a plan view, the area occupied by the hole HL may be larger than the area occupied by the pull tab part 120. In the plan view, the edges of the hole HL may be located outside the edges of the pull tab part 120. Specifically, a width c13 of the hole HL in the first direction DR1 may be greater than the width a21 of the pull tab part 120 in the first direction DR1. In addition, a width c21 of the hole HL in the second direction DR2 may be greater than the protruding length a22 of the pull tab part 120 in the second direction DR2. The width c13 of the hole HL in the first direction DR1 may be about 10 to 15 mm, and the width c21 of the hole HL in the second direction DR2 may be about 17 to 22 mm, but the present disclosure is not limited thereto. The width c21 of the hole HL in the second direction DR2 may be about 1.1 to 2.2 times the width c13 of the hole HL in the first direction DR1, but the present disclosure is not limited thereto.

The release film 300 may include first and second short sides SS31 and SS32 extending in the first direction DR1 and first and second long sides LS31 and LS32 extending in the second direction DR2 in a plan view. In the plan view, edges of the base film 100 and edges of the dummy film 400 may be disposed inside edges of the release film 300. Specifically, the first long side LS11 and the second long side LS12 of the base film 100 may be disposed between the first long side LS31 and the second long side LS32 of the release film 300, and the first short side SS11 and the second short side SS12 of the base film 100 may be disposed between the first short side SS31 and the second short side SS32 of the release film 300. In addition, the first long side LS21 and the second long side LS22 of the dummy film 400 may be disposed between the first short side SS31 and the second short side SS32 of the release film 300, and the first short side SS21 and the second short side SS22 of the dummy film 400 may be disposed between the first long side LS21 and the second long side LS32 of the release film 300.

In a plan view of the protective film 1, the first long side LS31 of the release film 300 may be spaced apart from the first long side LS11 of the base film 100 by a first distance e11 in the first direction DR1. The second long side LS32 of the release film 300 may be spaced apart from the second long side LS12 of the base film 100 by a second distance e12 in the first direction DR1. The first short side SS31 of the release film 300 may be spaced apart from the first short side SS11 of the base film 100 by a third distance e21 in the second direction DR2. The second short side SS32 of the release film 300 may be spaced apart from the second long side LS22 of the dummy film 400 by a fourth distance e22 in the second direction DR2. The first distance e11, the second distance e12, the third distance e21 and the fourth distance e22 may all have the same size. However, the present disclosure is not limited thereto, and they may also have different sizes in another embodiment. For example, each of the first distance e11, the second distance e12, the third distance e21, and the fourth distance e22 may have a size of about 0.5 to 2 mm, but the present disclosure is not limited thereto.

In a plan view, some edges of the hole HL surrounding the pull tab part 120 may be disposed between the pull tab part 120 and the dummy film 400. Specifically, a second side of the hole HL in the first direction DR1 may be disposed between the second side of the pull tab part 120 in the first direction DR1 and a first side of the first part 410 of the dummy film 400 in the first direction DR1. In addition, a first side of the hole HL in the first direction DR1 may be disposed between the first side of the pull tab part 120 in the first direction DR1 and a second side of the second part 420 of the dummy film 400 in the first direction DR1. A second distance c12 represents a distance between the first side of the hole HL and the second long side LS32 in the first direction DR1. In addition, a third side of the hole HL in the second direction DR2 may be disposed between the third side of the pull tab part 120 in the second direction DR2 and a first side of the third part 430 of the dummy film 400 in the second direction DR2, but the present disclosure is not limited thereto.

In a plan view, the third side of the pull tab part 120 in the second direction DR2 may be spaced apart from the third side of the hole HL in the second direction DR2 by a fifth distance e31. The first side of the third part 430 of the dummy film 400 in the second direction DR2 may be spaced apart from the third side of the hole HL disposed in the release film 300 by a sixth distance e41 in the second direction DR2. The sum of the fifth distance e31 and the sixth distance e41 may be equal to the distance d23 between the third side of the pull tab part 120 in the second direction DR2 and the first side of the third part 430 of the dummy film 400 in the second direction DR2.

In a plan view, the second side of the pull tab part 120 in the first direction DR1 may be spaced apart from the second side of the hole HL defined in the release film 300 by a seventh distance e32 in the first direction DR1. The first side of the first part 410 of the dummy film 400 in the first direction DR1 may be spaced apart from the second side of the hole HL defined in the release film 300 in the first direction DR1 by an eighth distance e42. The sum of the seventh distance e32 and the eighth distance e42 may be equal to the distance d11 between the second side of the pull tab part 120 in the first direction DR1 and the first side of the first part 410 of the dummy film 400 in the first direction DR1. A first distance c11 represents a distance between the second side of the hole HL and the first long side LS31 in the first direction DR1.

In a plan view, the first side of the pull tab part 120 in the first direction DR1 may be spaced apart from the first side of the hole HL disposed in the release film 300 by a ninth distance e33 in the first direction DR1. The second side of the second part 420 of the dummy film 400 in the first direction DR1 may be spaced apart from the first side of the hole HL defined in the release film 300 by a tenth distance e43 in the first direction DR1. The sum of the ninth distance e33 and the tenth distance e43 may be equal to the distance d12 between the first side of the pull tab part 120 in the first direction DR1 and the second side of the second part 420 of the dummy film 400 in the first direction DR1.

The fifth distance e31, the sixth distance e41, the seventh distance e32, the eighth distance e42, the ninth distance e33 and the tenth distance e43 may have the same size. However, the present disclosure is not limited thereto, and they may also have different sizes in another embodiment. For example, each of the fifth distance e31, the sixth distance e41, the seventh distance e32, the eighth distance e42, the ninth distance e33, and the tenth distance e43 may have a value of about 0.5 to 2 mm, but the present disclosure is not limited thereto.

The release film 300 may be a plastic film including polyimide, polyethylene terephthalate (PET), polyethylene naphthalate (PEN), polyethersulfone (PES), nylon, polytetrafluoro ethylene ("PTFE"), polyetheretherketone ("PEEK"), polycarbonate, or polyarylate.

The protective film 1 may further include the adhesive layer 200 disposed between the base film 100 and the release film 300 and between the dummy film 400 and the release film 300. As described above, the adhesive layer 200 may form the protective film body PF together with the base film 100. The adhesive layer 200 may be disposed on a surface of the base film 100 and a surface of the dummy film 400. The adhesive layer 200 may be disposed in an area where the base film 100 and the dummy film 400 overlap the release film 300 in a thickness direction (i.e., the third direction DR3). However, the adhesive layer 200 may not be disposed in an area where the release film 300 does not overlap the base film 100 or the dummy film 400 in the thickness direction. That is, the adhesive layer 200 may be disposed on the release film 300 only in an area where the release film 300 and the base film 100 overlaps and an area where the release film 300 and the dummy film 400 overlaps, but the present disclosure is not limited thereto.

As described above, the edges of the base film 100 and the dummy film 400 may be spaced apart from the edges of the release film 300 by the first distance e11, the second distance e12, the third distance e21 and the fourth distance e22. Therefore, an adhesive material that forms the adhesive layer 200 disposed between the release film 300 and the base film 100 and between the release film 300 and the dummy film 400 may not be transferred to other places.

A surface of the adhesive layer 200 may be an adhesive surface having adhesive strength. The other surface of the adhesive layer 200 may contact the surfaces of the base film 100 and the dummy film 400. For example, when the protective film body PF is attached to the display device 40 that is to be protected, the adhesive layer 200 may directly contact the display device 40. The adhesive layer 200 disposed between the base film 100 and the display device 40 may function to bond the base film 100 to the display device 40.

The adhesive layer 200 may be formed using an adhesive material such as an OCA or a pressure sensitive adhesive ("PSA") including an acrylic adhesive, a silicone adhesive, a urethane adhesive, a rubber adhesive, a vinyl ether adhesive, etc., but the present disclosure is not limited thereto.

Figure 10:
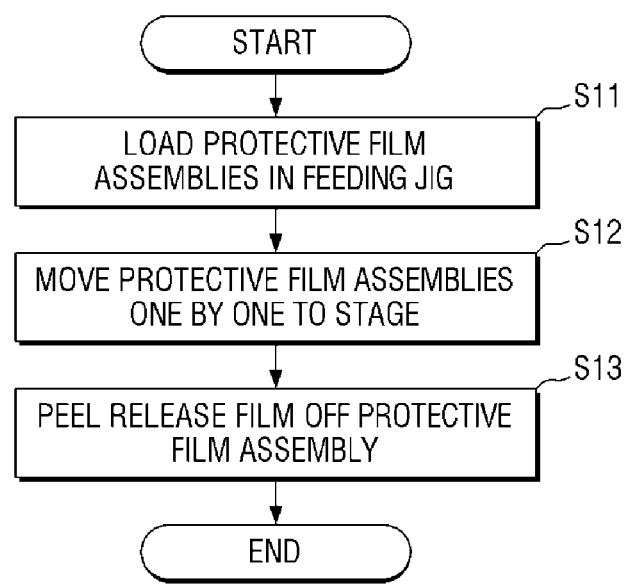
FIG. 10 is a flowchart illustrating a process of peeling a release film off a protective film according to an embodiment.

FIG. 10 is a flowchart illustrating a process of peeling a release film off a protective film according to an embodiment. FIGS. 11 through 15 are schematic views illustrating the process of peeling a release film off from a protective film according to an embodiment.

Referring to FIGS. 10 through 15, the process of peeling a release film off from a protective film according to the embodiment may include loading protective films in a feeding jig (operation S11), moving the protective films one by one to a stage (operation S12), and peeling a release film off from a protective film (operation S13).

The protective film body PF may protect a surface of an object to which the protective film body PF is attached from contamination by dust, debris, moisture and other contaminants or from external impact. For example, the protective film body PF may be attached to the glass article 10 of the display device 40 to protect a surface of the glass article 10 to which the protective film body PF is attached.

As described above, the release film 300 may be disposed on the protective film body PF to protect a surface on which the adhesive layer 200 is disposed. Therefore, a process of peeling the release film 300 off from a protective film 1 may be performed before a process of attaching the protective film body PF to a surface of an object to be protected.

Figure 11:
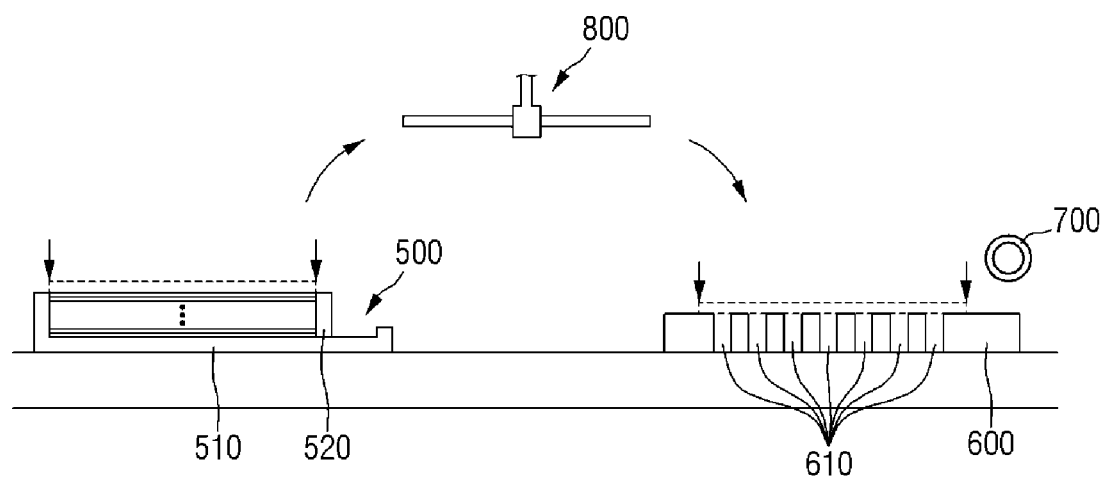
FIGS. 11 through 15 are schematic views illustrating the process of peeling a release film off a protective film according to an embodiment.
Figure 12:
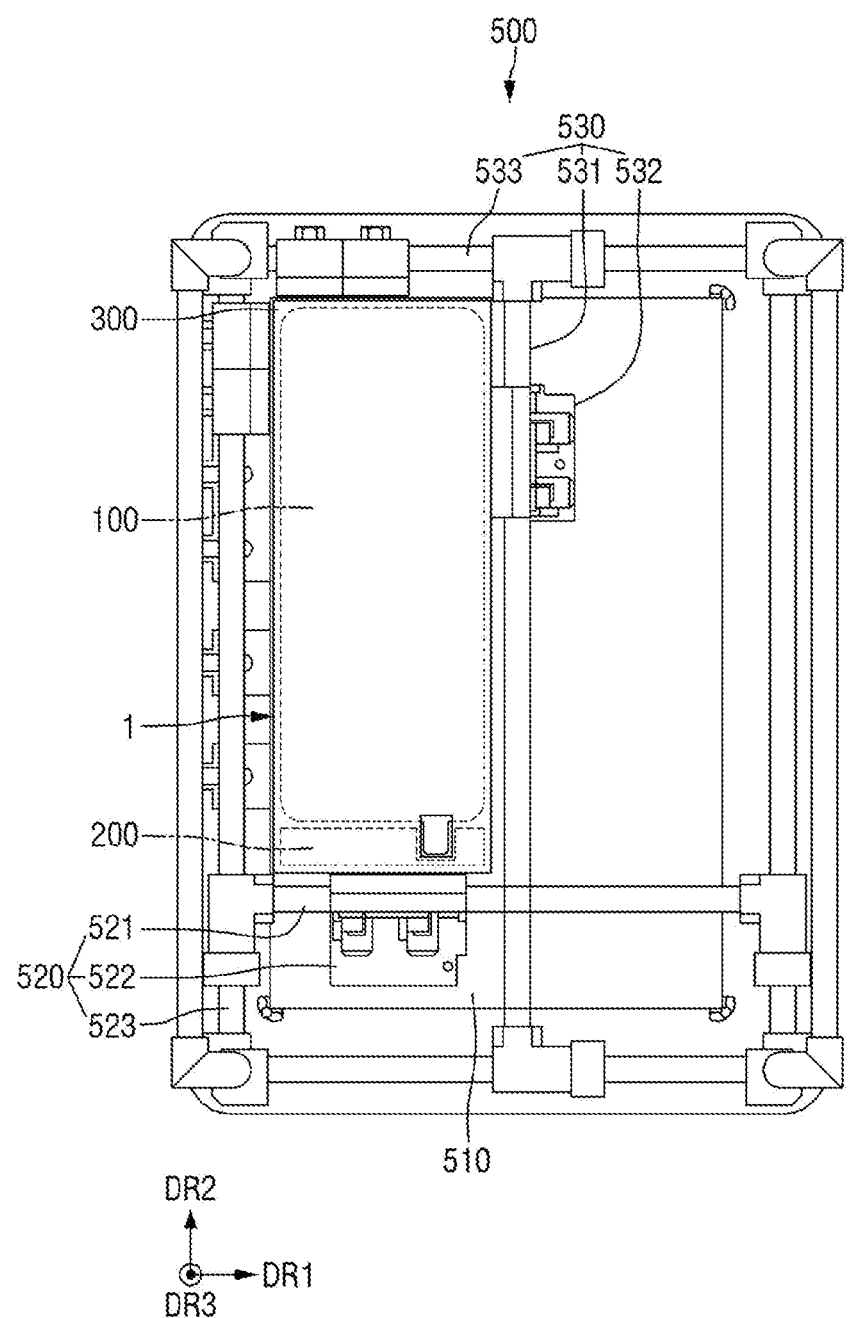
Figure 13:
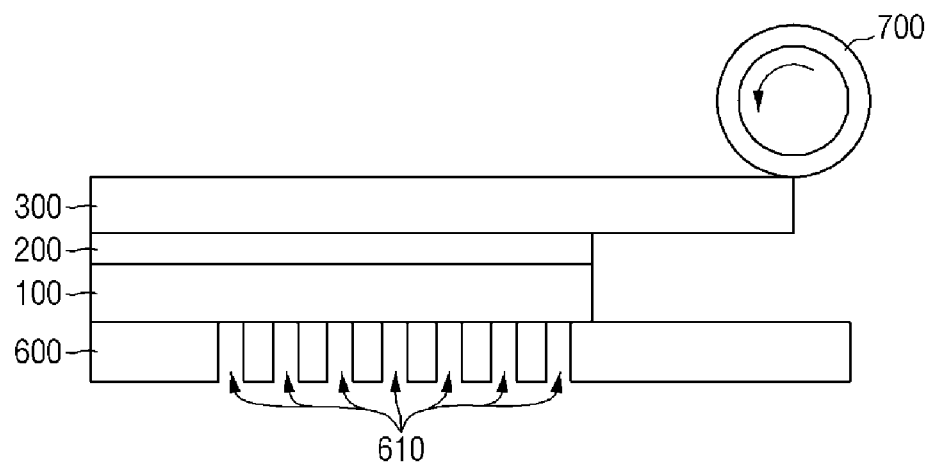
Figure 14:
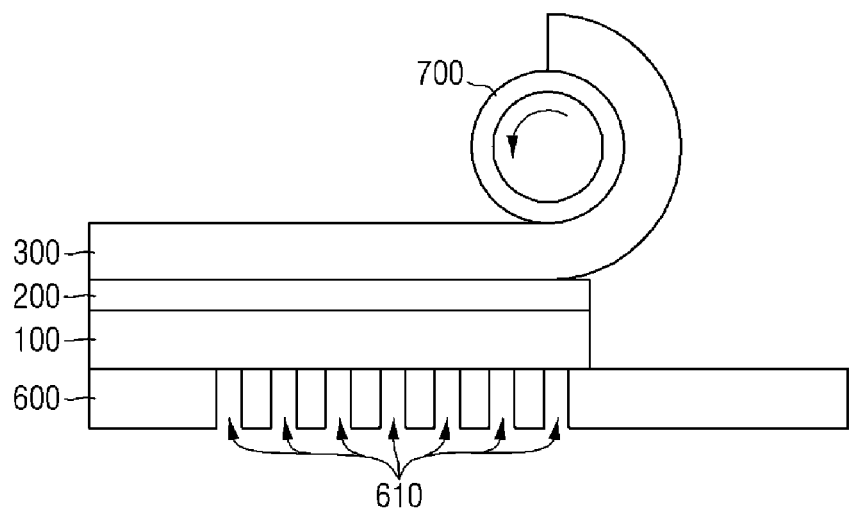
Figure 15:
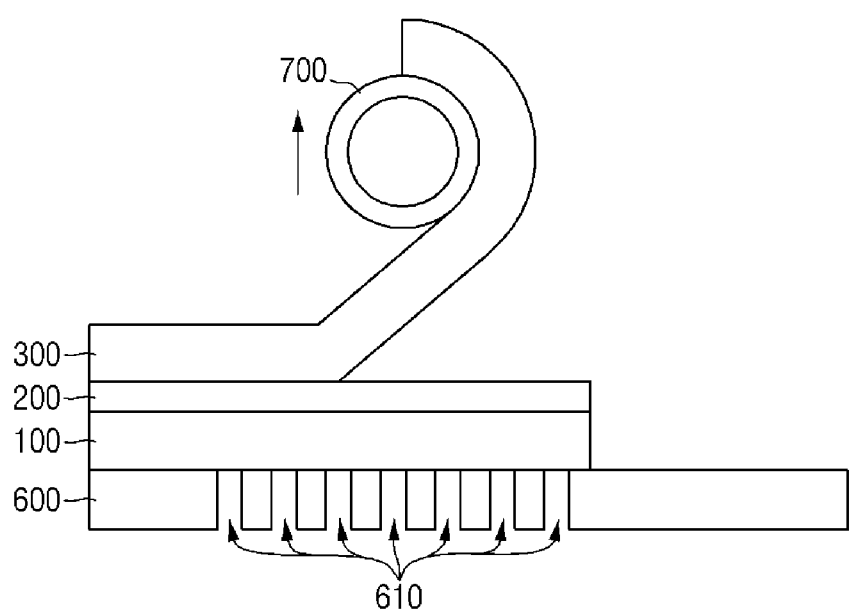

The process of peeling the release film 300 off from the protective film 1 may be performed for each protective film 1 one by one on a stage 600. Therefore, the protective films 1 may be fed to the stage 600 one by one. In FIG. 11, a protective film 1 is picked up by a transport robot 800 and transported from the feeding jig 500 to the stage 600. However, the present disclosure is not limited thereto, and other transport alternatives may also be used.

The protective films 1 before being fed to the stage 600 may be loaded in the feeding jig 500. The number of the protective films 1 loaded in the feeding jig 500 may be, but is not limited to, 100 or more, 500 or more, or 1000 or more.

In the process of peeling the release film 300, the transport robot 800 may pick up a protective film 1 at a predetermined position in the feeding jig 500 and transport the protective film 1 to a predetermined position on the stage 600. Therefore, in order to reduce the process distribution of the peeling process of the release film 300, the positions of the protective films 1 loaded in the feeding jig 500 need to be uniform. The shape of the feeding jig 500 that can keep the positions of the loaded protective films 1 constant will now be described.

The feeding jig 500 may be rectangular in a plan view. However, the present disclosure is not limited thereto, and the feeding jig 500 may also have shapes of other figures such as a circle in another embodiment.

The feeding jig 500 may include a loading part 510 which forms a bottom surface of the feeding jig 500, a first guide part 520 which guides an object to be loaded in the second direction DR2, and a second guide part 530 which guides the object in the first direction DR1.

The first guide part 520 may include a first guide bar 521 extending in the first direction DR1, a first guide member 522 coupled to the first guide bar 521, and a first guide rail 523 on which the first guide bar 521 moves. The second guide part 530 may include a second guide bar 531 extending in the second direction DR2, a second guide member 532 coupled to the second guide bar 531, and a second guide rail 533 on which the second guide bar 531 moves.

The protective films 1 may be disposed on the loading part 510. The protective films 1 disposed on the loading part 510 may be guided and aligned by the first guide part 520 and the second guide part 530.

Specifically, the first guide bar 521 to which the first guide member 522 is coupled may be moved by the first guide rail 523. The first guide member 522 may be moved by the first guide bar 521 to contact a second side surface, in the second direction DR2, of each protective film 1 loaded on the loading part 510. The second side surface of each protective film 1 in the second direction DR2 may be supported toward the first side in the second direction DR2 by the first guide member 522.

The second guide bar 531 to which the second guide member 532 is coupled may be moved by the second guide rail 533. The second guide member 532 may be moved by the second guide bar 531 to contact a first side surface, in the first direction DR1, of each protective film 1 loaded on the loading part 510. The first side surface of each protective film 1 in the first direction DR1 may be supported toward the second side in the first direction DR1 by the second guide member 532.

That is, the protective films 1 may be aligned in the second direction DR2 by the first guide part 520 and aligned in the first direction DR1 by the second guide part 530. Therefore, the positions of the protective films 1 disposed in the feeding jig 500 according to an embodiment may be kept constant.

The process of peeling the release film 300 off a protective film 1 may be performed on the stage 600. The stage 600 may include vacuum holes 610. The stage 600 may provide a space in which the peeling process is performed, and the vacuum holes 610 may fix a protective film 1 to the stage 600 by providing a suction force through a decompression process.

Through the process of peeling the release film 300, the release film 300 is removed from the protective film 1, leaving only the protective film body PF including the base film 100 and the adhesive layer 200. When the release film 300 is peeled off, the dummy film 400 may also be removed.

Referring to FIGS. 10 and 13 through 15, the peeling of the release film off the protective film (operation S13) may be performed using a peeling roller 700.

The peeling roller 700 may be shaped like a cylinder having a diameter of about 3.5 to 15 mm, but the present disclosure is not limited thereto. An adhesive member (not illustrated) having adhesive strength may be attached to both surfaces of the peeling roller 700 in order for effective peeling. For example, the adhesive member may be a double-sided tape, but the present disclosure is not limited thereto. The adhesive member attached to the peeling roller 700 may be replaced whenever peeling efficiency is reduced due to reduced adhesive strength.

When the peeling roller 700 is closely attached to a distal end of the release film 300 and then rotated, the release film 300 may be attached to the peeling roller 700 and thus peeled off the protective film body PF. Here, the adhesion between the peeling roller 700 and the release film 300 may be, but is not limited to, greater than the adhesion between the release film 300 and the protective film body PF.

Once the release film 300 is peeled through the rotation of the peeling roller 700 to a length corresponding to a quarter or more of a circumference of the cylindrical peeling roller 700, stable peeling is possible after that. Thereafter, the release film 300 may be completely peeled off the protective film body PF by moving the peeling roller 700. For example, the release film 300 may be completely peeled off by moving the peeling roller 700 upward. The peeling of the release film 300 may be achieved by both the rotation and movement of the peeling roller 700. However, the present disclosure is not limited thereto, and the peeling of the release film 300 may also be achieved by any one of the rotation and movement of the peeling roller 700.

According to the protective film 1 according to the embodiment, when the release film 300 is peeled off, the protective film 1 may be aligned at a predetermined position in the feeding jig 500 through the dummy film 400 that compensates for the protruding shape of the pull tab part 120.

In addition, the edges of the base film 100 may be disposed inside the release film 300 to make it easy to peel the release film 300 using the peeling roller 700 and to minimize the transfer of the adhesive material, which forms the adhesive layer 200 disposed between the base film 100 and the release film 300, to other places.

Figure 16:
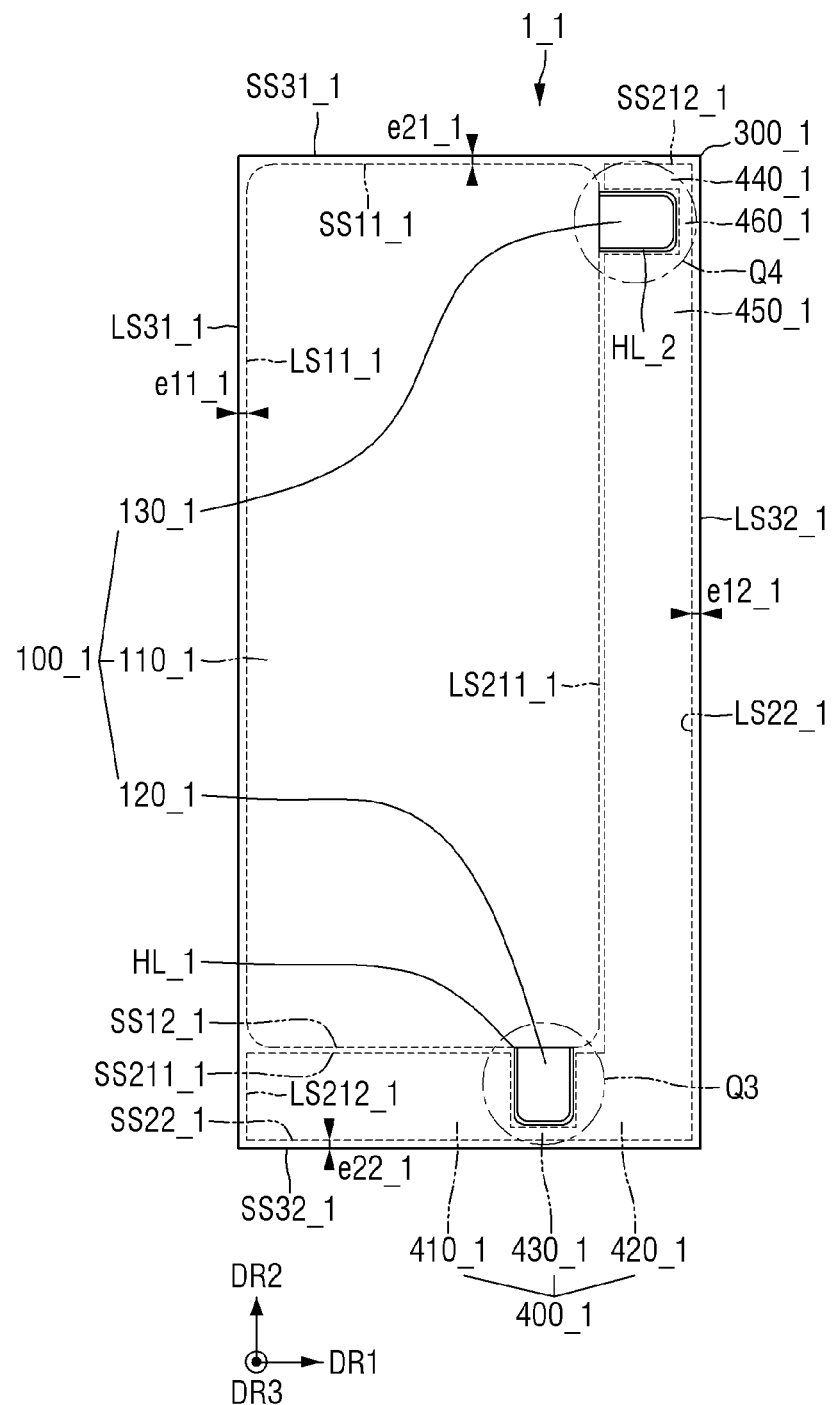
FIG. 16 is a plan view of a protective film according to another embodiment.
Figure 17:
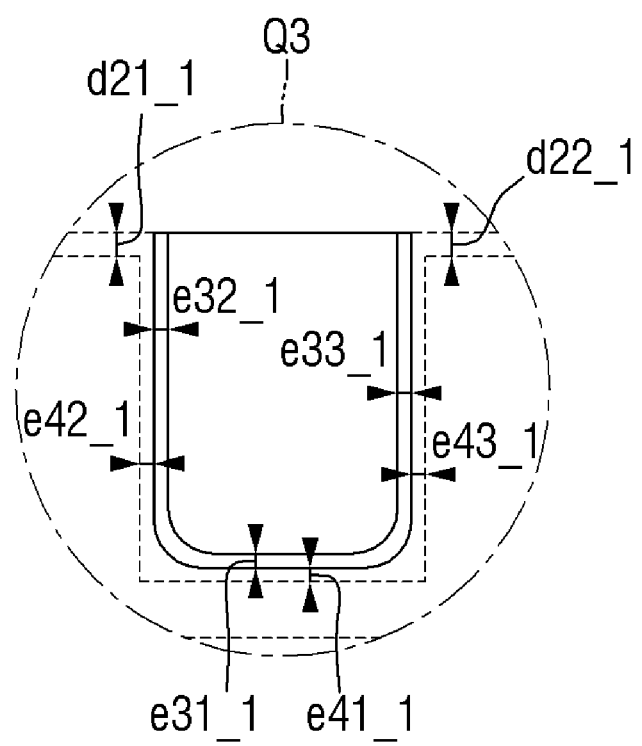
FIG. 17 is an enlarged view of area Q3 of FIG. 16.
Figure 18:
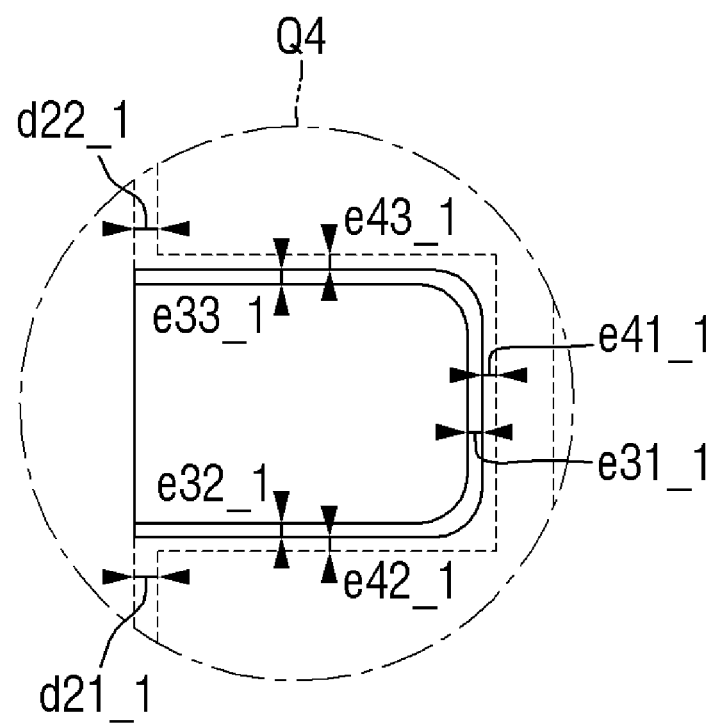
FIG. 18 is an enlarged view of area Q4 of FIG. 16.

FIG. 16 is a plan view of a protective film according to another embodiment. FIG. 17 is an enlarged view of area Q3 of FIG. 16. FIG. 18 is an enlarged view of area Q4 of FIG. 16.

Referring to FIGS. 16 through 18, the protective film 1_1 according to the current embodiment is different from the protective film 1 according to the embodiment of FIG. 3 in that it includes a first pull tab part 120_1 protruding from a second side surface of a protective part 110_1 of a base film 100_1 in the second direction DR2 and a second pull tab part 130_1 protruding from a first side surface of the protective part 110_1 in the first direction DR1 and that a dummy film 400_1 surrounds both the first pull tab part 120_1 and the second pull tab part 130.

The base film 100_1 according to the current embodiment may include a plurality of pull tab parts 120_1 and 130_1. In FIG. 16, the base film 100_1 includes the first pull tab part 120_1 protruding from the second side surface of the protective part 110_1 in the second direction DR2 and the second pull tab part 130_1 protruding from the first side surface of the protective part 110_1 in the first direction DR1. However, the protruding positions and directions and the number of the pull tab parts 120_1 and 130_1 included in one base film 100_1 are not limited to the above example.

The protective film 1_1 according to the current embodiment may include the dummy film 400_1 surrounding the first pull tab part 120_1 and the second pull tab part 130_1. The dummy film 400_1 may be disposed wherever the pull tab parts 120_1 and 130_1 are disposed in order to remove protrusion steps of the pull tab parts 120_1 and 130_1. That is, the dummy film 400_1 may be disposed around areas where the pull tab parts 120_1 and 130_1 are disposed. For example, the dummy film 400_1 may include a first part 410_1, a second part 420_1 and a third part 430_1 disposed to surround the first pull tab part 120_1. The first part 410_1 of the dummy film 400_1 may be disposed on a second side of the first pull tab part 120_1 in the first direction DR1, the second part 420_1 may be disposed on a first side of the first pull tab part 120_1 in the first direction DR1, and the third part 430_1 may be disposed on a third side of the first pull tab part 120_1 in the second direction DR2. The first part 410_1, the second part 420_1, and the third part 430_1 may be integrally formed, but the present disclosure is not limited thereto.

In addition, the dummy film 400_1 may include a fourth part 440_1, a fifth part 450_1, and a sixth part 460_1 disposed to surround the second pull tab part 130_1. The fourth part 440_1 of the dummy film 400_1 may be disposed on a first side of the second pull tab part 130_1 in the second direction DR2, the fifth part 450_1 may be disposed on a second side of the second pull tab part 130_1 in the second direction DR2, and the sixth part 460_1 may be disposed on a third side of the second pull tab part 130_1 in the first direction DR1. The fourth part 440_1, the fifth part 450_1, and the sixth part 460_1 may be integrally formed, but the present disclosure is not limited thereto.

The release film 300_1 may define holes HL_1 and HL_2 therein. In the protective film 1_1 according to the embodiment, the hole HL_2 defined in the release film 300_1 may expose a surface of the second pull tab part 130_1. The shape of the hole HL_2 may correspond to the shape of the second pull tab part 130_1. In a plan view, the area occupied by the hole HL_2 may be larger than the area occupied by the second pull tab part 130_1. In the plan view, the edges of the hole HL_2 may be located outside the edges of the second pull tab part 130_1. The explanation regarding the hole HL above may be applied to the holes HL_1 and HL_2.

The first through third parts 410_1 through 430_1 and the fourth through sixth parts 440_1 through 460_1 of the dummy film 400_1 may be separated from each other, but the present disclosure is not limited thereto.

Other details (especially, corresponding reference characters) are the same or similar to those described above with reference to FIGS. 1 through 15, and thus a further detailed description thereof will be omitted.

According to the protective film 1_1 according to the current embodiment, when a release film 300_1 is peeled off, the protective film 1_1 may be aligned at a predetermined position in the feeding jig 500 through the dummy film 400_1 that compensates for the protruding shapes of the first pull tab part 120_1 and the second pull tab part 130_1.

In addition, edges of the base film 100_1 may be disposed inside the release film 300_1 to make it easy to peel the release film 300_1 using the peeling roller 700 and to minimize the transfer of an adhesive material, which forms an adhesive layer 200 disposed between the base film 100_1 and the release film 300_1, to other places.

Figure 19:
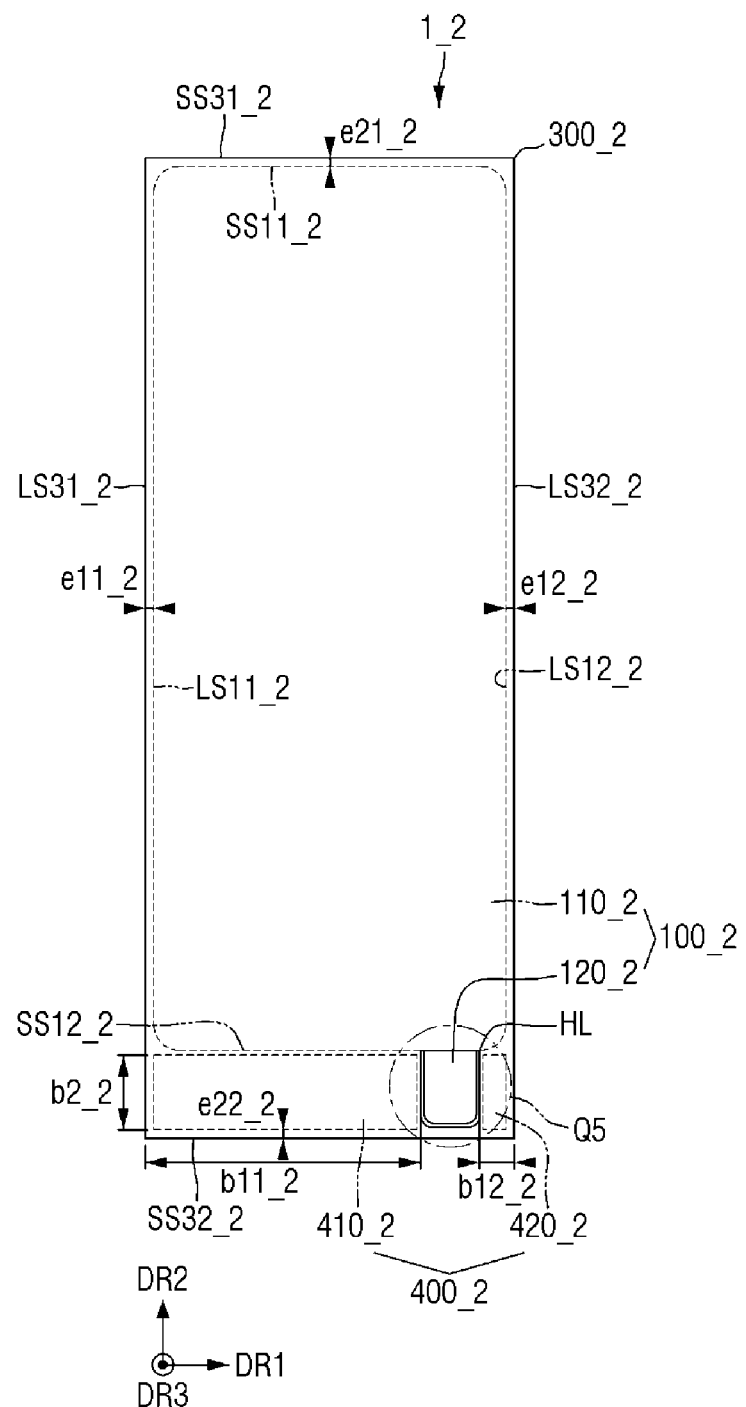
FIG. 19 is a plan view of a protective film according to another embodiment.
Figure 20:
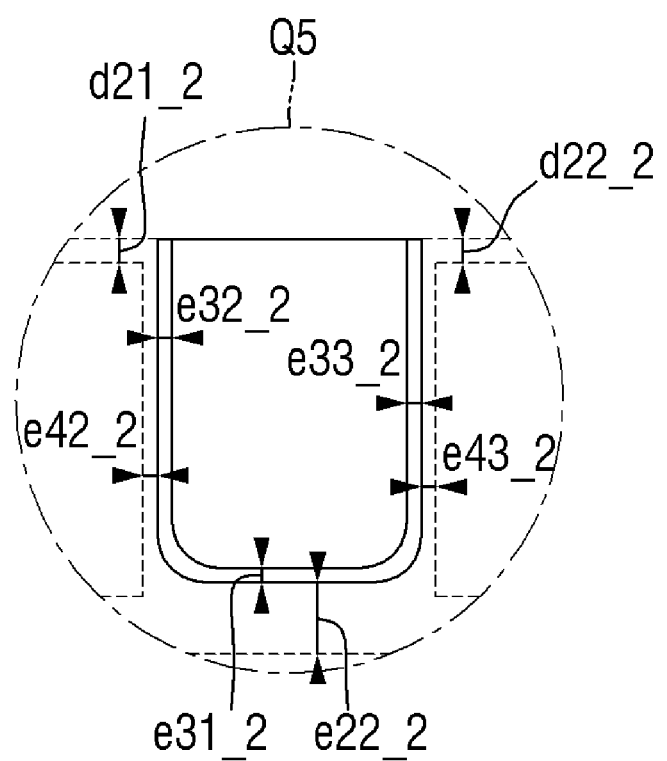
FIG. 20 is an enlarged view of area Q5 of FIG. 19.

FIG. 19 is a plan view of a protective film according to another embodiment. FIG. 20 is an enlarged view of area Q5 of FIG. 19.

Referring to FIGS. 19 and 20, the protective film 1_2 according to the current embodiment is different from the protective film 1 according to the embodiment of FIG. 3 in that a first part 410_2 and a second part 420_2 of a dummy film 400_2 are separated from each other without being integrated.

The dummy film 400_2 included in the protective film 1_2 according to the current embodiment may include the first part 410_2 disposed on a second side of a pull tab part 120_2 in the first direction DR1 and the second part 420_2 disposed on a first side of the pull tab part 120_2 in the first direction DR1. A width of the first part 410_2 of the dummy film 400_2 in the second direction DR2 and a width of the second part 420_2 of the dummy film 400_2 in the second direction DR2 may be equal. However, each of the width (i.e., b2_2) of the first part 410_2 of the dummy film 400_2 in the second direction DR2 and the width of the second part 420_2 of the dummy film 400_2 in the second direction DR2 may be greater than a width of the pull tab part 120_2 in the second direction DR2. Therefore, in a plan view, a third side of the pull tab part 120_2 in the second direction DR2 may not be aligned with a second side surface (corresponding to the second long side LS22 in FIG. 5) of each of the first part 410_2 and the second part 420_2 of the dummy film 400_2 in the second direction DR2 and may not protrude from the second side surface of each of the first part 410_2 and the second part 420_2 in the second direction DR2.

According to the protective film 1_2 according to the current embodiment, when a release film 300_2 is peeled off, the protective film 1_2 may be aligned at a predetermined position in the feeding jig 500 through the dummy film 400_2 that compensates for the protruding shape of the pull tab part 120_2.

In addition, edges of a base film 100_2 may be disposed inside the release film 300_2 to make it easy to peel the release film 300_2 using the peeling roller 700 and to minimize the transfer of an adhesive material, which forms an adhesive layer 200 disposed between the base film 100_2 and the release film 300_2, to other places.

Other details (especially, corresponding reference characters) are the same or similar to those described above with reference to FIGS. 1 through 15, and thus a further detailed description thereof will be omitted.

Figure 21:
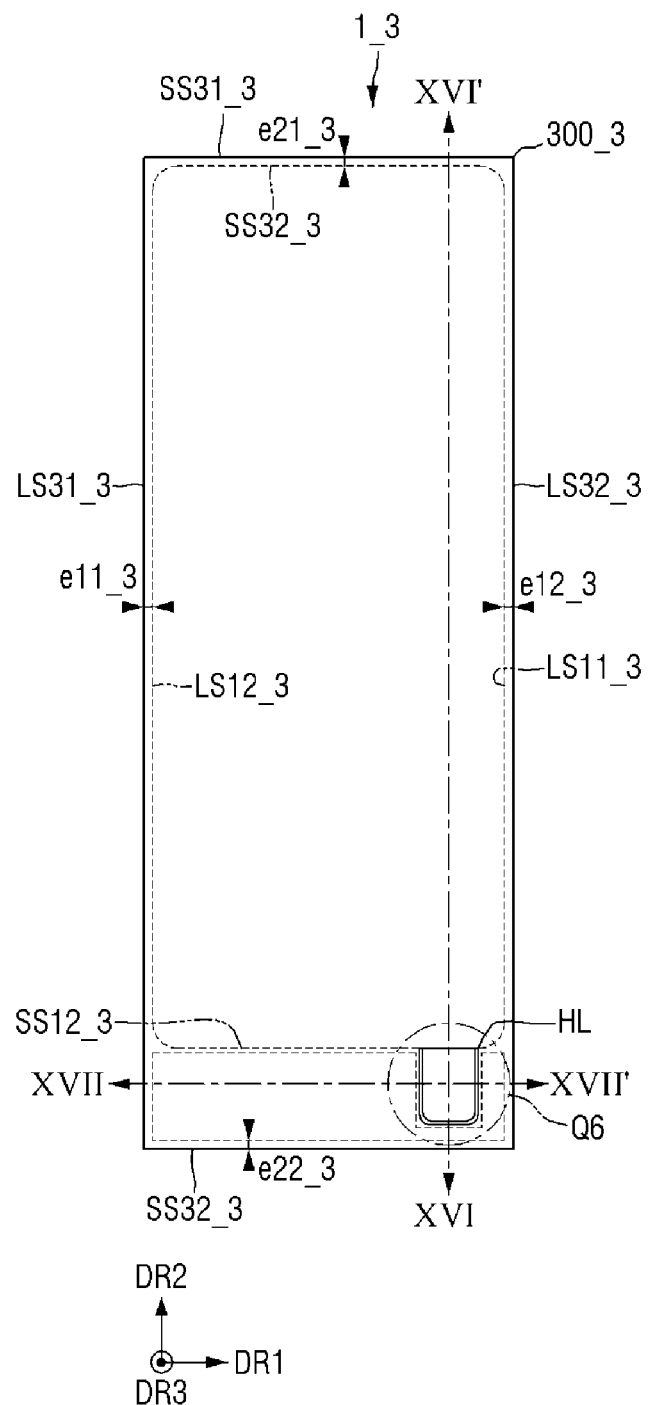
FIG. 21 is a plan view of a protective film according to another embodiment.
Figure 22:
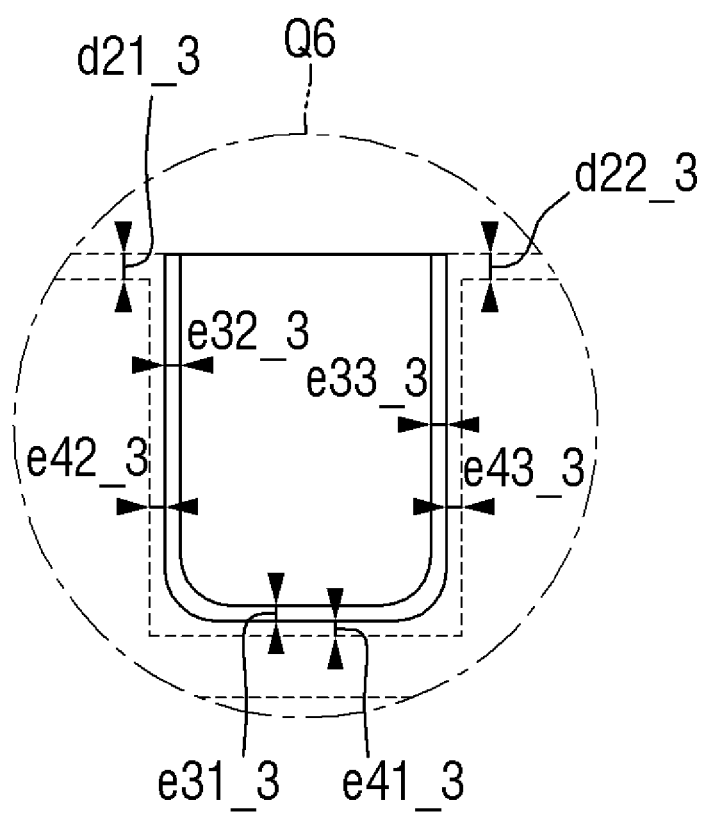
FIG. 22 is an enlarged view of area Q6 of FIG. 21.
Figure 23:
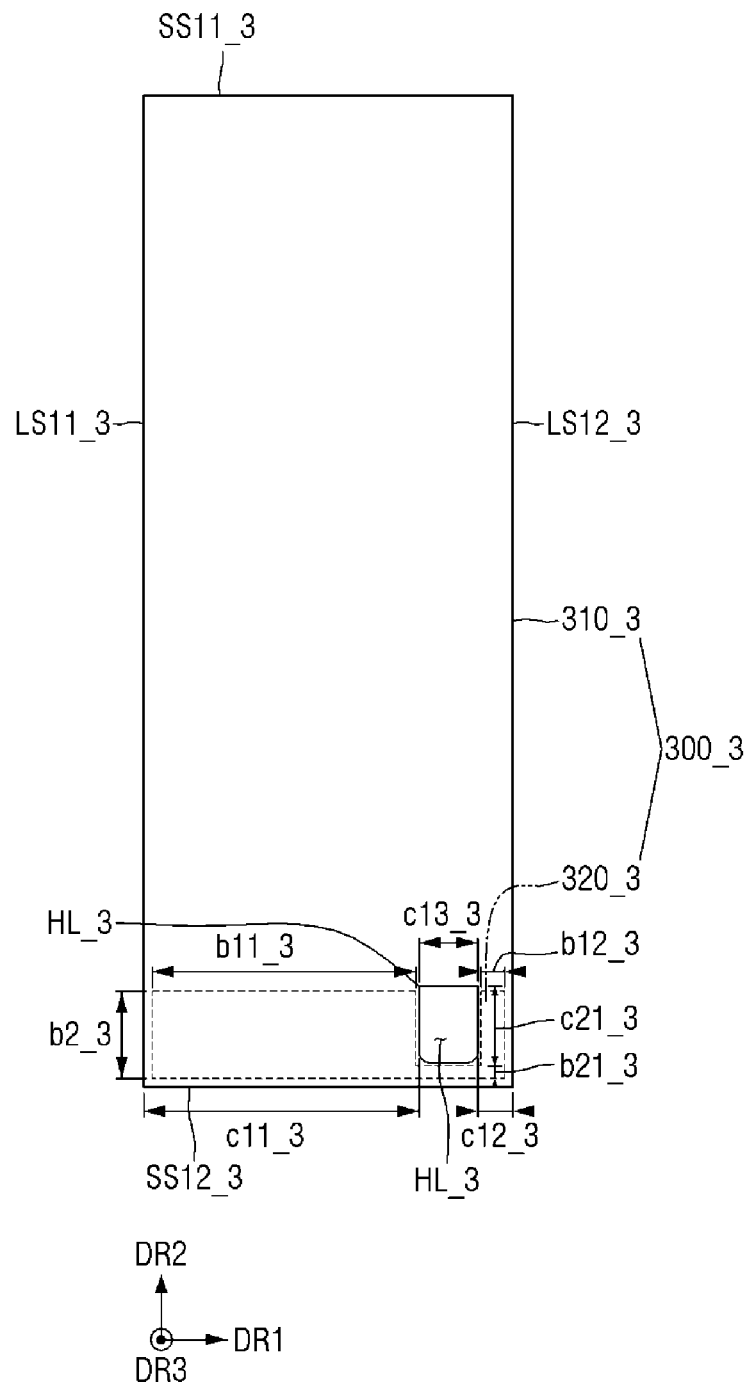
FIG. 23 is a plan view of a release film of the protective film according to the embodiment of FIG. 21.
Figure 24:
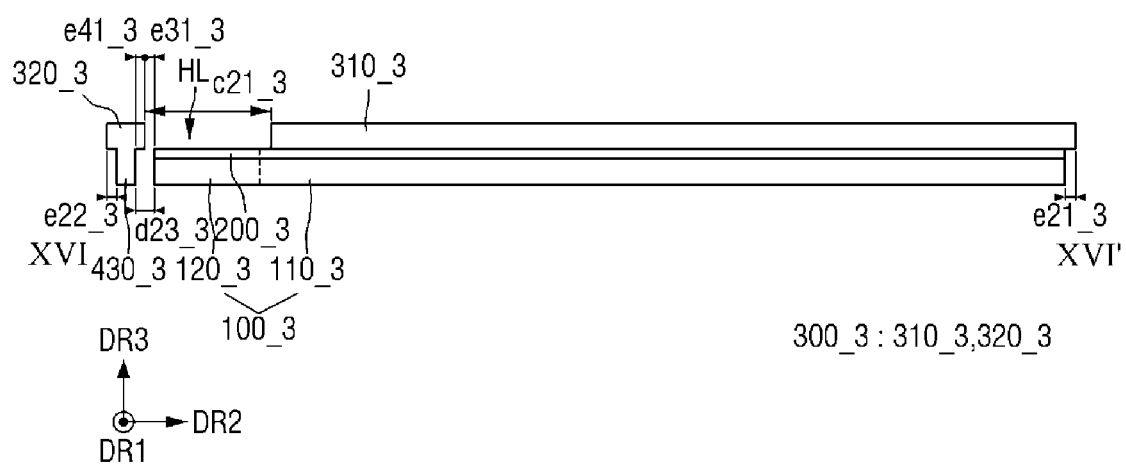
FIG. 24 is a cross-sectional view taken along line XVI-XVI' of FIG. 21.
Figure 25:
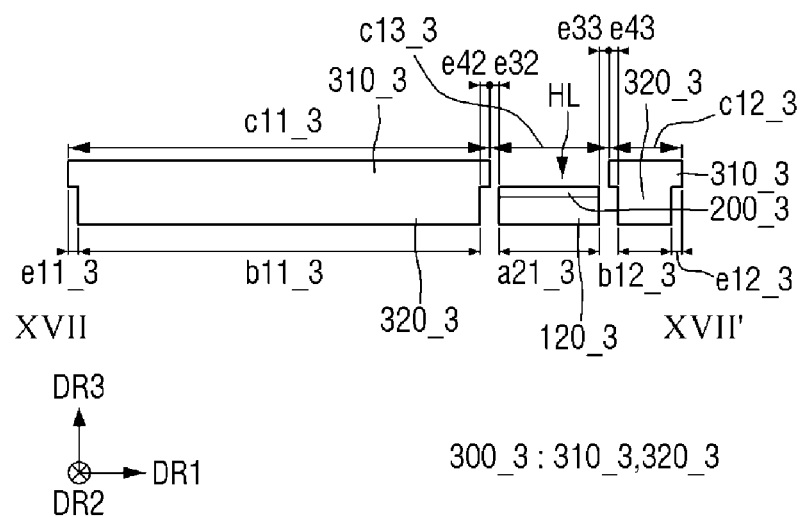
FIG. 25 is a cross-sectional view taken along line XVII-XVII' of FIG. 21.

FIG. 21 is a plan view of a protective film according to another embodiment. FIG. 22 is an enlarged view of area Q6 of FIG. 21. FIG. 23 is a plan view of a release film of the protective film according to the embodiment of FIG. 21. FIG. 24 is a cross-sectional view taken along line XVI-XVI' of FIG. 21. FIG. 25 is a cross-sectional view taken along line XVII-XVII' of FIG. 21.

Referring to FIGS. 21 through 25, the protective film 1_3 according to the current embodiment is different from the protective film 1 including the separate dummy film 400 according to the embodiment of FIG. 3 in that the release film 300_3 includes a dummy part 320_3 surrounding a side surface of a base film 100_3 on which a pull tab part 120_3 is disposed.

The release film 300_3 included in the protective film 1_3 according to the current embodiment may include a cover part 310_3 and the dummy part 320_3. The cover part 310_3 may protect a surface of the base film 100_3 as in the embodiment of FIG. 3. The dummy part 320_3 may be a part protruding in the third direction DR3 and may reduce a step of the pull tab part 120_3 protruding toward the third side in the second direction DR2. A width b2_3 of the dummy part 320_3 in the second direction DR2 may be greater than a width of the pull tab part 120_3 in the second direction DR2. Therefore, a third end of the pull tab part 120_3 in the second direction DR2 may not be aligned with a second side surface (corresponding to the second long side LS22 in FIG. 5) of the dummy part 320_3 in the second direction DR2 and may not protrude from the second side surface of each of the dummy part 320_3 in the second direction DR2.

According to the protective film 1_3 according to the current embodiment, when the release film 300_3 is peeled off, the protective film 1_3 may be aligned at a predetermined position in the feeding jig 500 through the dummy part 320_3 that compensates for the protruding shape of the pull tab part 120_3.

In addition, edges of the base film 100_3 may be disposed inside the release film 300_3 to make it easy to peel the release film 300_3 using the peeling roller 700 and to minimize the transfer of an adhesive material, which forms an adhesive layer 200 disposed between the base film 100_3 and the release film 300_3, to other places.

Other details (especially, corresponding reference characters) are the same or similar to those described above with reference to FIGS. 1 through 15, and thus a further detailed description thereof will be omitted.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:
1. A protective film comprising:
a release film;

a base film which is disposed on the release film and comprises a protective part and a first pull tab part protruding from a first side surface of the protective part; and a first dummy film which is disposed on the release film, does not overlap the base film in a plan view, and comprises a part partially surrounding the first pull tab part, wherein edges of the base film and edges of the first dummy film are disposed inside edges of the release film in the plan view, wherein the release film defines a first hole provided in an area overlapping the first pull tab part in the plan view, wherein the first pull tab part includes three edges which are disposed inside edges of the first hole in the plan view, and wherein the edges of the first dummy film are disposed outside the edges of the first hole in the plan view.

2. The protective film of claim 1, further comprising an adhesive layer which is disposed on the release film and comprises a first adhesive layer and a second adhesive layer, wherein the first adhesive layer is disposed between the release film and the base film, and the second adhesive layer is disposed between the release film and the first dummy film.

3. The protective film of claim 2, wherein the base film and the first dummy film overlap the release film in the plan view.

4. The protective film of claim 3, wherein the first adhesive layer is disposed only in an area where the release film and the base film overlap and the second adhesive layer is disposed only in an area where the release film and the first dummy film overlap.

5. The protective film of claim 1, wherein distances between edges of the protective part and the edges of the release film adjacent to the edges of the protective part in the plan view are about 0.5 to 2 millimeters (mm).

6. The protective film of claim 1, wherein distances between the edges of the first dummy film and the edges of the release film adjacent to the edges of the first dummy film in the plan view are about 0.5 to 2 mm.

7. The protective film of claim 1, further comprising a second dummy film, wherein the base film further comprises a second pull tab part protruding from a second side surface of the protective part, and the second dummy film comprises a part partially surrounding the second pull tab part.

8. The protective film of claim 7, wherein the release film defines a second hole provided in an area overlapping the second pull tab part in the plan view.

9. The protective film of claim 8, wherein edges of the second pull tab part are disposed inside edges of the second hole.

10. The protective film of claim 1, wherein distances between the edges of the first pull tab part facing the first dummy film and the part of the first dummy film partially surrounding the first pull tab part in the plan view are about 1 to 3 mm.

11. The protective film of claim 1, wherein the first dummy film and the release film are monolithic.

12. A protective film comprising:

a release film;

an adhesive layer which is disposed on the release film;

a first film which is disposed on the adhesive layer and comprises a protective part and a protruding part protruding from a side of the protective part; and a second film which is disposed on the adhesive layer and comprises a part disposed adjacent to the protruding part, wherein edges of the first film and edges of the second film are disposed inside edges of the release film in a plan view, and the adhesive layer is disposed only in an area where the release film overlaps the first film and the second film in the plan view, wherein the release film defines a first hole provided in an area overlapping the protruding part in the plan view, wherein the protruding part includes three edges which are disposed inside edges of the first hole in the plan view, and wherein the edges of the second film are disposed outside the edges of the first hole in the plan view.

13. The protective film of claim 12, wherein the release film defines a hole provided in an area overlapping the protruding part in the plan view.

14. The protective film of claim 13, wherein edges of the protruding part are disposed inside edges of the hole.

15. The protective film of claim 12, wherein distances from the edges of the release film to the edges of the first film adjacent to the edges of the release film in the plan view are about 0.5 to 2 mm.

16. The protective film of claim 12, wherein distances between the edges of the protruding part facing the second film and the part of the second film disposed adjacent to the protruding part in the plan view are about 1 to 3 mm.

* * * * *